(12) United States Patent
Dent (10) Patent No.: US 6,210,066 B1
(45) Date of Patent: Apr. 3, 2001

(54) BREAKAWAY BRACKET ASSEMBLY

(76) Inventor: Clifford Dent, 10 Town Plz., #130, Durango, CO (US) 81301

( * ) Notice: Subject to any disclaimer, the term of this patent is extended or adjusted under 35 U.S.C. 154(b) by 0 days.

(21) Appl. No.: 09/181,231

(22) Filed: Oct. 27, 1998

(51) Int. Cl.[7] .................................................. F16D 9/06
(52) U.S. Cl. ................................. 403/2; 52/98; 248/548
(58) Field of Search ..................... 403/2; 52/98, 726.3; 52/296; 256/13.1; 248/218.4, 219.1, 548, 909

(56) References Cited

U.S. PATENT DOCUMENTS

| | | | |
|---|---|---|---|
| 1,926,925 | 9/1933 | Wescott | 287/125 |
| 3,002,775 | * 10/1961 | Mueller et al. | 256/13.1 X |
| 3,499,630 | 3/1970 | Dashio | 256/13.1 |
| 3,521,413 | 7/1970 | Scott et al. | 52/98 |
| 3,837,752 | 9/1974 | Shewchuk | 403/2 |
| 3,951,556 | 4/1976 | Strizki | 403/2 |
| 3,967,906 | 7/1976 | Strizki | 403/2 |
| 4,528,786 | 7/1985 | Dinitz et al. | 52/98 |
| 4,603,526 | * 8/1986 | Bollmann | 403/296 X |
| 4,720,204 | 1/1988 | Johnson et al. | 403/24 |
| 5,211,685 | * 5/1993 | Garcia | 403/2 X |
| 5,261,759 | * 11/1993 | Decoux et al. | 403/2 X |
| 5,474,408 | 12/1995 | Dinitz et al. | 411/5 |
| 5,855,443 | * 1/1999 | Faller et al. | 403/2 |

* cited by examiner

Primary Examiner—Lynne H. Browne
Assistant Examiner—John R. Cottingham
(74) Attorney, Agent, or Firm—Clifford Dent; E. Russell Tarleton; Seed IP Law Group PLLC (57) ABSTRACT

A breakaway bracket assembly (10) for connecting two structural members, such as a sign post (12) and a base (14). The bracket (10) has a first end strap (20) configured for attachment to the post (12) and a second end strap (22) configured for attachment to the base (14). The first and second end straps (20, 22) are integrally formed with a central section (24) that comprises a pair of flanges (28, 30) having a preformed brake point (34) that will fail when the first and second end straps (20, 22) are subjected to a predetermined load.

8 Claims, 7 Drawing Sheets

BREAKAWAY BRACKET ASSEMBLY

TECHNICAL FIELD

The present invention pertains to bracket assemblies for mounting and supporting signposts, luminaries, and power poles, and, more particularly, to breakaway bracket assemblies having a pre-formed stress point that is readily broken when subjected to a predetermined load and is easily replaceable.

BACKGROUND OF THE INVENTION

Existing highway signs, fences, luminaries, and guardrails frequently utilize a two-part support post. Such posts typically include a stub post anchored in the ground with one end projecting several inches above the ground to form a base for attachment of the signpost or light pole. A mounting flange is formed on or attached to the projecting end of the stub post. The signpost or light pole has a corresponding flange that is then bolted to the stub post flange.

Numerous systems have been proposed for providing a rigid mounting assembly that can resist wind loads and light impacts while at the same time failing at a predetermined load, such as from a vehicle impact, to minimize damage to the support post and the vehicle, and to reduce injuries. The present invention represents an improvement over these systems. The applicant's prior invention of a breakaway connector, which is the subject of U.S. Pat. No. 4,923,319, is utilized in the present invention, as is described more fully herein below.

The need for the present invention arises from improved designs as well as federal and state requirements regarding the installation of signposts, luminaries, guardrails, power poles, and the like. Thus, the present invention is not only an improvement over existing and prior devices, but it also meets all current and pending federal and state requirements.

SUMMARY OF THE INVENTION

The present invention is directed to a mounting system using a breakaway bracket assembly for connecting two or more structural members. In one embodiment, the breakaway bracket assembly comprises a first end-strap configured for attachment to the first structural member; a second end-strap configured for attachment to the second structural member; and a central member connecting the first and second end-straps together, the central member including a pre-formed stress point such that the bracket assembly will break at the pre-formed stress point when subjected to a predetermined load.

In accordance with another aspect of the present invention, the central member is integrally formed with the first and second end-straps.

In accordance with a further aspect of the present invention, one or more of the end-straps include flanges formed thereon for positioning against a structural member.

In accordance with yet another aspect of the present invention, the preformed stress point of the central member comprises at least one flange extending in at least one direction from the central member, and a pre-formed breakpoint positioned adjacent to the at least one flange. Ideally, two flanges are formed, one on each side of the pre-formed stress point such that one flange is positioned against a first structural member and the other flange is positioned against a second structural member.

In accordance with yet a further aspect of the present invention, the preformed stress point comprises a cross-sectional area of reduced material that is formed from side walls that slope from the flanges toward the pre-formed stress point.

In accordance with another embodiment of the present invention, a breakaway bracket assembly for holding a post to a base is provided. The assembly comprises a first bracket member having one or more flanges for attaching the first bracket member to the base; a second bracket member having one or more flanges for attaching the second bracket member to a post; a plurality of legs on either of the first and second bracket members for stabilizing and supporting the second bracket member on top of the first bracket member; and a breakaway connector for positioning between and attaching to the first bracket member and the second bracket member thereby connecting the second bracket member to the first bracket member, the breakaway connector further having a pre-formed stress point that features when subjected to a predetermined load, enabling separation of the second bracket member from the first bracket member.

In accordance with yet another aspect of this embodiment of the present invention, the first bracket member is sized and shaped for slidable engagement with the base. The second bracket member is sized and shaped for slidable engagement with the post.

In accordance with yet another aspect of the present invention, the legs are spaced apart to be positioned around the outside of the breakaway connector.

In accordance with another embodiment of the present invention, a mounting system is provided comprising a post and a base; a first bracket member having one or more flanges for attachment to the base; a second bracket member having one or more flanges for attachment to the post; a plurality of legs that stabilize and support the second bracket member on top of the first bracket member; and a breakaway connector positioned between and connected to the second bracket member and the first bracket member, the breakaway connector having a pre-formed stress point that enables separation of the second bracket member from the first bracket member when subjected to a pre-determined load.

As will be readily appreciated from the foregoing, the present invention provides a breakaway bracket assembly and mounting system that is easily adaptable to existing signposts, luminaries, power poles, guardrails, and the like. The assembly provides a single breakpoint yet provides stability and high strength. In one embodiment, the single breakpoint is provided as an integrally-formed connection between the two mounting flanges. In another embodiment, the single breakpoint is provided in a single fastener attached to the bracket members that are stabilized by means of one or more legs. The first or lower bracket member can be configured for mounting to any style of base. Rerouting of electrical wires is not required, thus, the present invention facilitates easy installation and reinstallation while providing a rigid and stable mounting platform that resists normal loads and breaks under a higher load, such as a vehicle impact.

BRIEF DESCRIPTION OF THE DRAWINGS

The foregoing and other features and advantages of the present invention will be more readily appreciated as the same become better understood from the accompanied detailed description when taken in conjunction with the following drawings, wherein.

DETAILED DESCRIPTION

Figure 1:
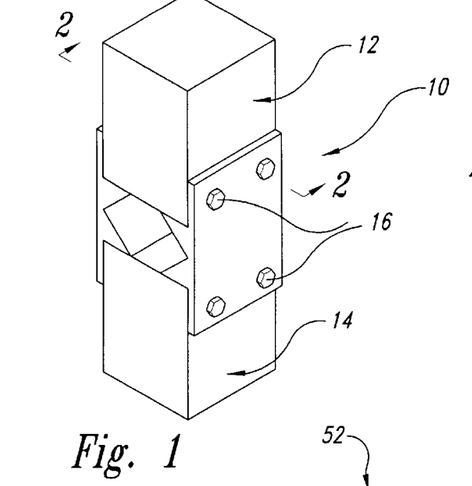
FIG. 1 is an isometric projection of a first embodiment of a breakaway bracket assembly formed in accordance with the present invention for connecting two structural members.

Referring initially to FIG. 1, illustrated therein is a first embodiment of the present invention comprising first and second breakaway brackets 10 connecting two structural members, a post 12 and a base 14. The post 12 and base 14 may be formed from wood, plastic, metal, or composite material as needed for the particular application. In most applications, the base 14 is anchored in the ground. Four fasteners 16 hold the breakaway brackets 10 to the structural members 12, 14. In this case, the fasteners comprise bolts 16 held in position by nuts 18, as shown in FIG. 2.

Figure 2:
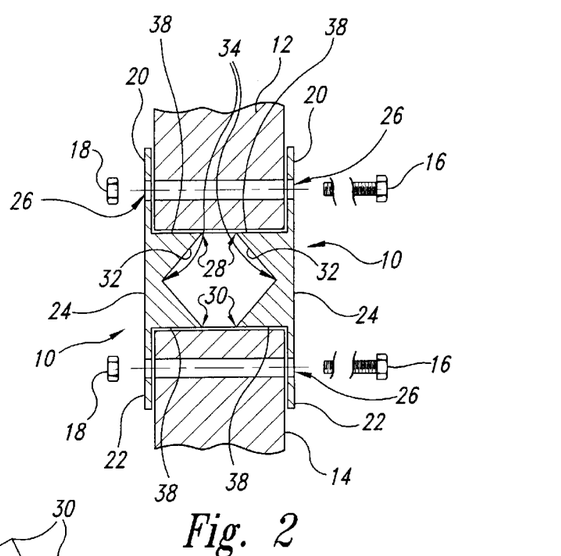
FIG. 2 is cross-sectional configuration of the breakaway bracket assembly of FIG. 1.

FIG. 2 shows in greater detail the cross sectional configuration of the breakaway brackets 10 and their mounting to the post 12 and base 14. The breakaway bracket 10 has a first end strap 20 configured for attachment to the post member 12 and a second end strap 22 configured for attachment to the base member 14. The first and second end straps 20, 22 have a planar shape and project outward in opposing directions from a central section 24. Ideally, the central section 24 is integrally formed with the first end strap 20 and second end strap 22. Openings 26 are formed in each of the end straps 20, 22 to accommodate the bolts 16. In this embodiment, each strap member 20, 22 has two openings formed in spaced horizontal relationship.

The central section 24 on each breakaway bracket 10 functions as a preformed stress point, comprised of a pair of flanges 28, 30 that extend outward from the central section 24 with sidewalls 32 that slope inwardly to a pre-formed breakpoint 34. As shown in FIG. 2, the pre-formed break point 34 comprises a cross-sectional area of reduced material that will fail when the first and second end straps 20, 22 are subjected to a predetermined load.

The post 12 and base 14 bear against the exposed faces 36, 38 on the top and bottom flanges 28, 30, respectively.

Figure 4A:
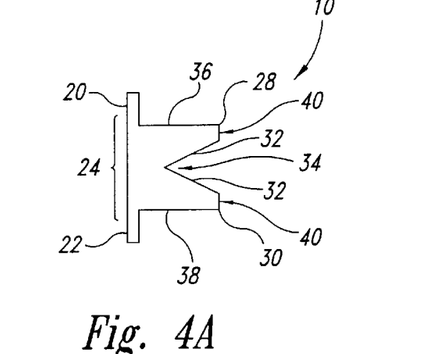
FIG. 4A–C are side views of alternative cross-sectional configurations of the breakaway bracket formed in accordance with the present invention.
Figure 4B:
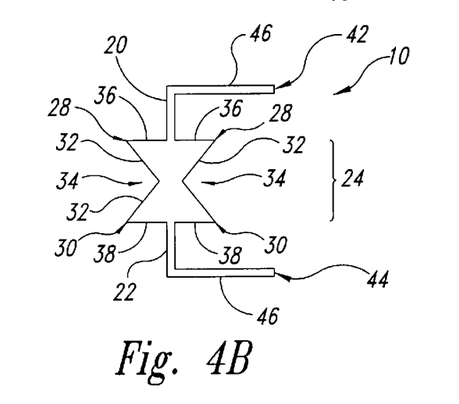
Figure 4C:
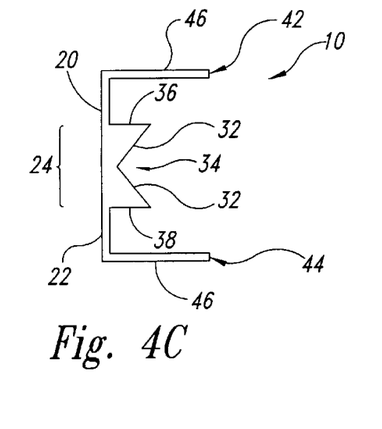

FIGS. 4A–4C show alternative embodiments of the breakaway bracket 10 formed in accordance with the present invention. For the sake of convenience, the numbering of common elements from FIGS. 1 and 2 will be used in FIGS. 4A–4C.

FIG. 4A illustrates an alternative embodiment of the breakaway bracket 10 wherein the flanges 28, 30 terminate in a side face 40 instead of a point as shown in FIG. 2. Under certain loads the termination of the flanges 28, 30 with a side face 40 will provide greater strength and prevent premature failure of the flanges 28, 30.

FIG. 4B illustrates yet another alternative embodiment of the breakaway bracket 10 wherein the flanges 28, 30 extend outwardly from the central section 24 in opposing directions. In addition, the embodiment of FIG. 4B has first and second legs 42, 44 projecting at substantially a 90° angle from the ends of the first and second end straps 20, 22. These legs 42, 44 have exposed faces 46 for positioning against the post 12 and base 14. Although openings to facilitate the use of fasteners are not shown in these embodiments, it is to be understood that such will be incorporated as shown in the embodiment of FIG. 2.

Figure 5:
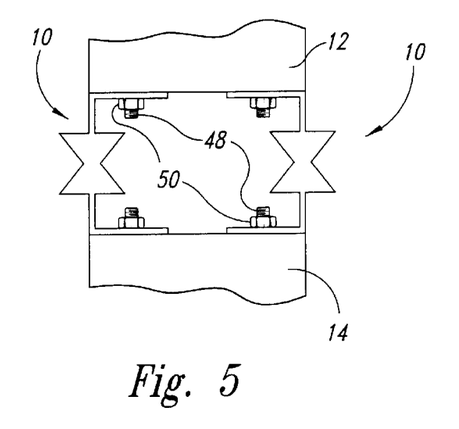
FIG. 5 is a front plan view of the breakaway bracket of FIG. 4C connecting two structural members.
Figure 6:
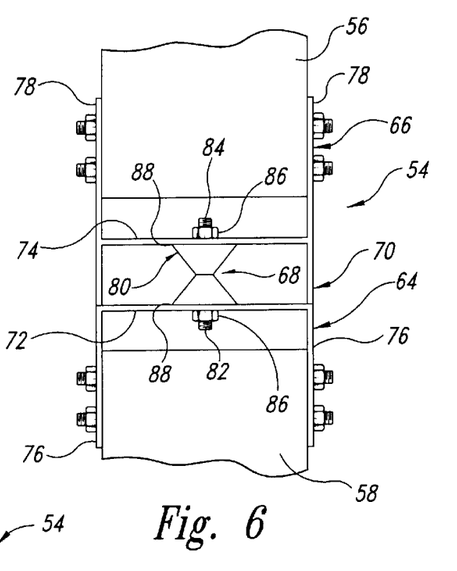
FIG. 6 is a front plan view of an alternative embodiment of a breakaway bracket assembly formed in accordance with the present invention for connecting two structural members.
Figure 7:
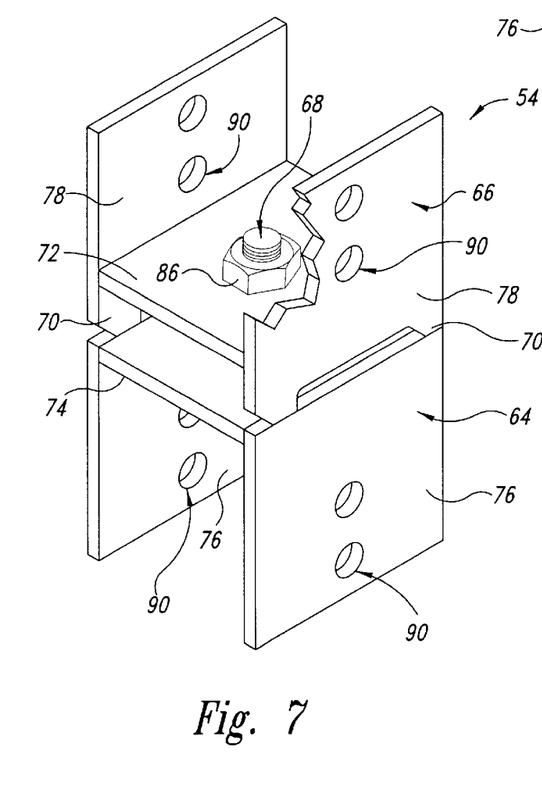
FIG. 7 is an isometric view of the breakaway bracket assembly of FIG. 6 in assembled configuration.

FIG. 5 illustrates the installation of the embodiment depicted in FIG. 4B in connection with a post 12 and base 14. In this case, studs 48 projecting from the post 12 and base 14 are inserted through openings (not shown) in the first and second legs 42, 44, and are secured thereon with nuts 50.

Figure 3:
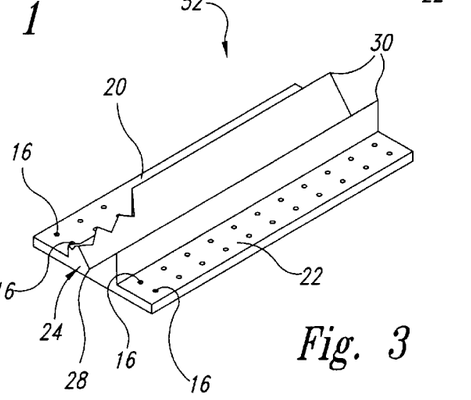
FIG. 3 is an isometric projection of an extruded piece for manufacturing the breakaway bracket of FIG. 1.

FIG. 3 illustrates a plate 52 used in one method for forming the breakaway bracket 10 described above. The plate 52 has first and second end strap portions 20, 22 formed on both sides of the central section 24. Ideally, the plate 52 is formed by an extrusion process, although other methods may be used as will be known to those skilled in the art. The bracket to be formed from the plate 52 can be dimensioned and cut from the plate 52 to the size required for the application.

Figure 8:
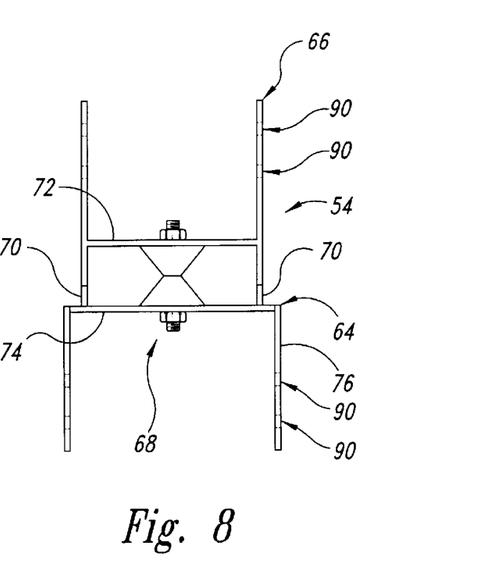
FIG. 8 is a front plan view of the assembled breakaway bracket assembly of FIG. 7.
Figure 9:
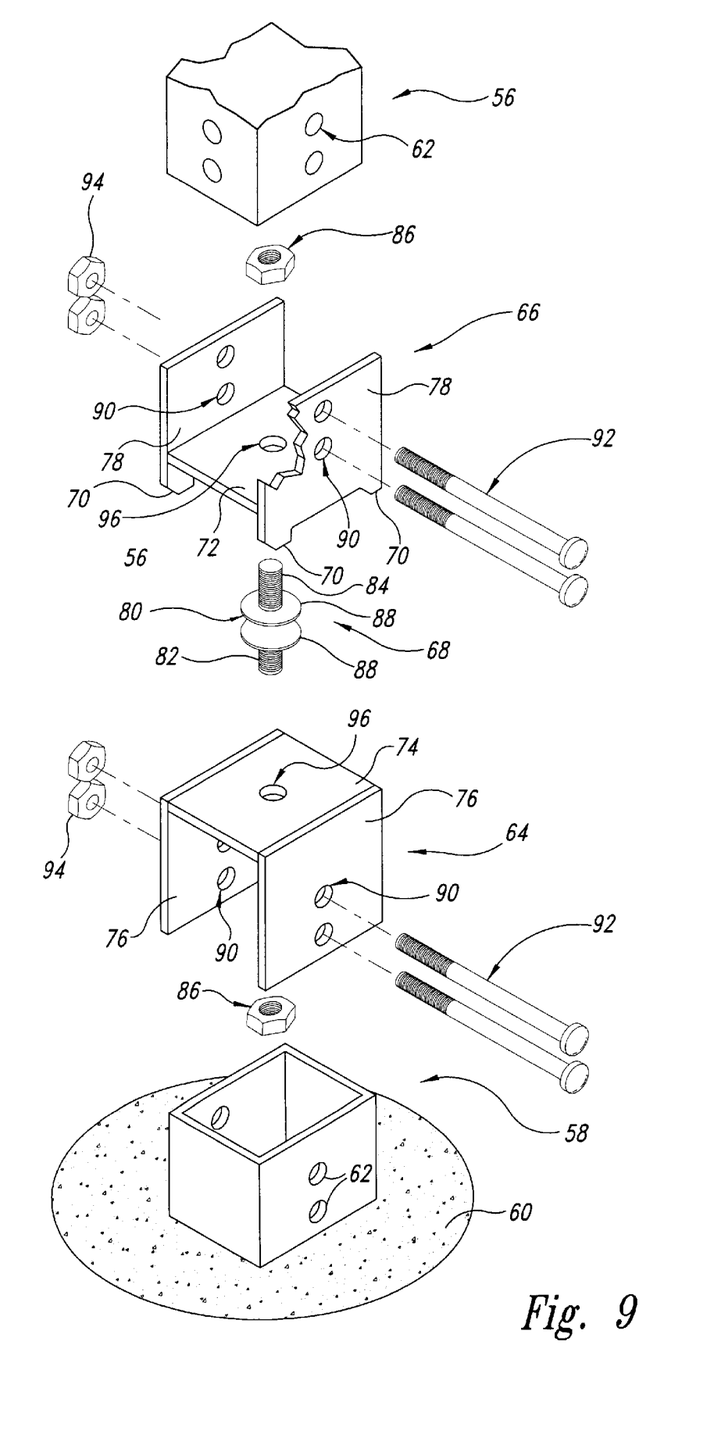
FIG. 9 is an exploded view of the breakaway bracket assembly of FIG. 7 in conjunction with a base and post structural members.

An alternative embodiment of the present invention will now be described in conjunction with FIGS. 6–9. As shown therein, a breakaway bracket assembly 54 is used in conjunction with a post 56 and base 58. The base 58, as shown in FIG. 9, is anchored to a structural member, in this case concrete 60. Both the post 56 and the base 58 are of rectangular tubular metal construction with a hollow longitudinal bore and opening 62 formed therein to accommodate fasteners.

The bracket assembly 54, comprises a first bracket member 64 configured for attachment to the base 58 and a second bracket member 66 configured for attachment to the post 56. A breakaway connector 68 is positioned between and connects the first bracket member 64 to the second bracket member 66. A plurality of legs 70 support and stabilize the second bracket member 66 on the first bracket member 64.

The first bracket member 64 and the second bracket member 66 are comprised of a cross member 72, 74, respectively. A pair of legs 76 depends from the first cross member at substantially a right angle to be in space parallel relationship with each other. Similarly, the second bracket member has a pair of legs 78 that depend at substantially a right angle from the second cross member 74 to be in space parallel relationship with each other. In this embodiment, the legs 70 project downward from the second bracket member 66 to bear against the cross member 72 of the first bracket member 64. However, it is to be understood that legs could be formed on the top face of the cross member 72 to project upward and bear against the cross member 74 of the second bracket member 66. As shown in FIG. 8, the first bracket member 64 is larger than the second bracket member 66 to provide a stable mounting platform. However, both brackets 64, 66 can be of the same size if required.

The breakaway connector 68 used to attach the first and second bracket members 64, 66 together is described in greater detail in applicant's prior U.S. Pat. No. 4,923,319, which is incorporated herein by reference in its entirety. Briefly, the connector 68 has a breakaway shank 80 with a threaded first end 82 and a second threaded end 84 projecting therefrom. Nuts 86 are threaded on to the connector 68. The shank has laterally projecting and circumscribing flanges 88 that are positioned to bear against the first and second bracket members 64, 66, as shown.

Openings 90 in the legs 76, 78, accommodate fasteners 92 that are secured and placed with nuts 94. Similarly, openings 96 in the cross members 72, 74, accommodate the threaded first and second ends 82, 84 of the breakaway connector 68.

Figure 10:
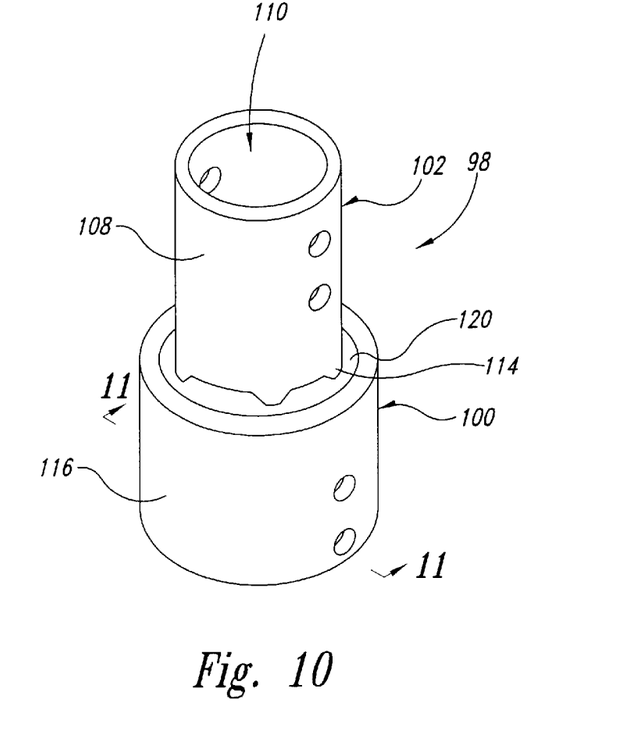
FIG. 10 is an isometric view of an assembled breakaway bracket assembly having a cylindrical configuration formed in accordance with the present invention.
Figure 11:
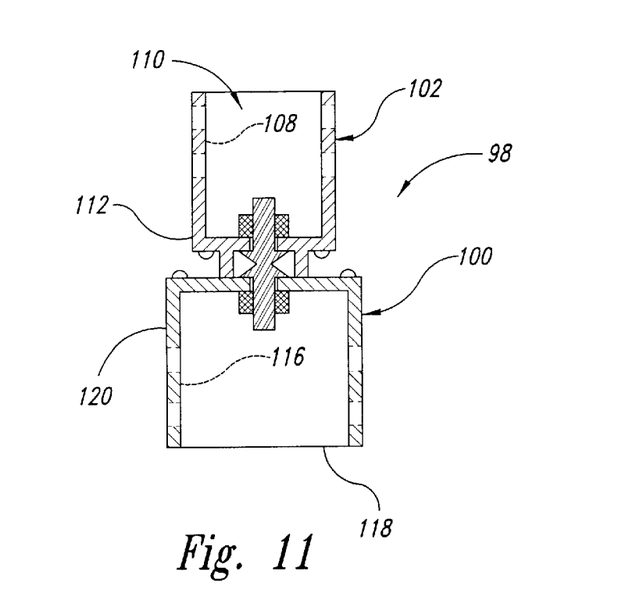
FIG. 11 is a cross-sectional view of the cylindrical breakaway bracket assembly of FIG. 10.
Figure 12:
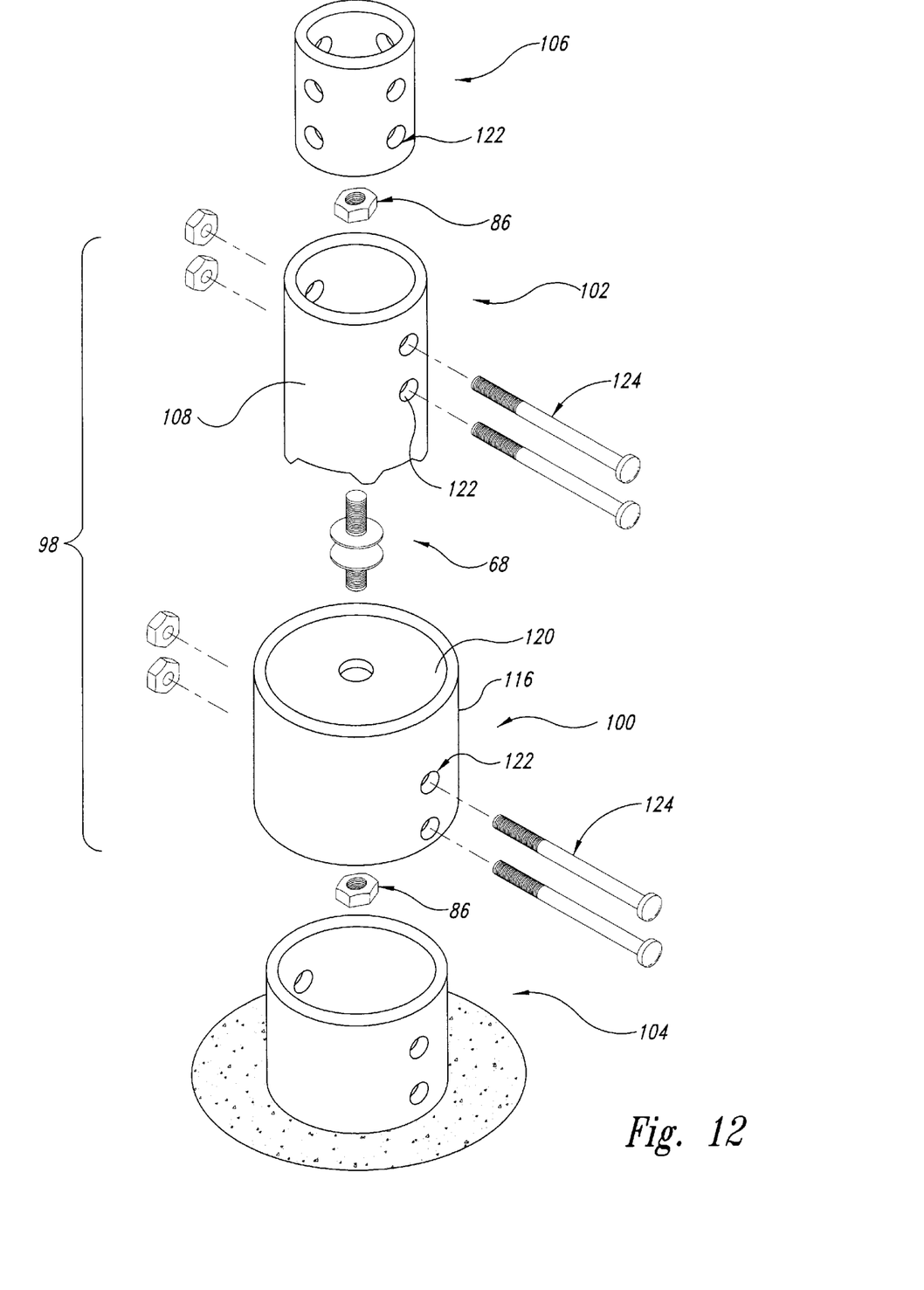
FIG. 12 is an exploded view of the cylindrical breakaway bracket assembly of FIG. 10 in conjunction with a cylindrical base and cylindrical post structural members.

FIGS. 10–12 illustrate an alternative embodiment of the present invention wherein the bracket members 64, 66, are replaced by a breakaway support assembly 98 comprising a first cylindrical support member 100 and second cylindrical support member 102. The support members 100, 102 are sized and shaped to be slidably engaged with a cylindrical base 104, and cylindrical post 106, respectively.

In this embodiment, the first cylindrical support member 100 has a cylindrical wall 108 that circumscribes a longitudinal axle bore 110 as shown in FIG. 1, one end of the bore 110 is closed off with a bottom wall 112. Legs 114 project from the side wall 108, and are preferably integrally formed therewith.

Similarly, the second cylindrical support member 102 has a cylindrical side wall 116 that circumscribes an axle bore 118 that is closed off at one end by a top wall 120, as shown in FIG. 11. Openings 122 formed in the base 104, the post 106, the side walls 108, 116, and the top and bottom walls 112, 120 accommodate the fasteners 124.

A breakaway connector 68 as described above in the embodiment shown in FIGS. 6–9, is used to connect the first and second support members 100, 102. While this embodiment differs in its configuration from the prior embodiment, it functions essentially the same in all respects.

Figure 13:
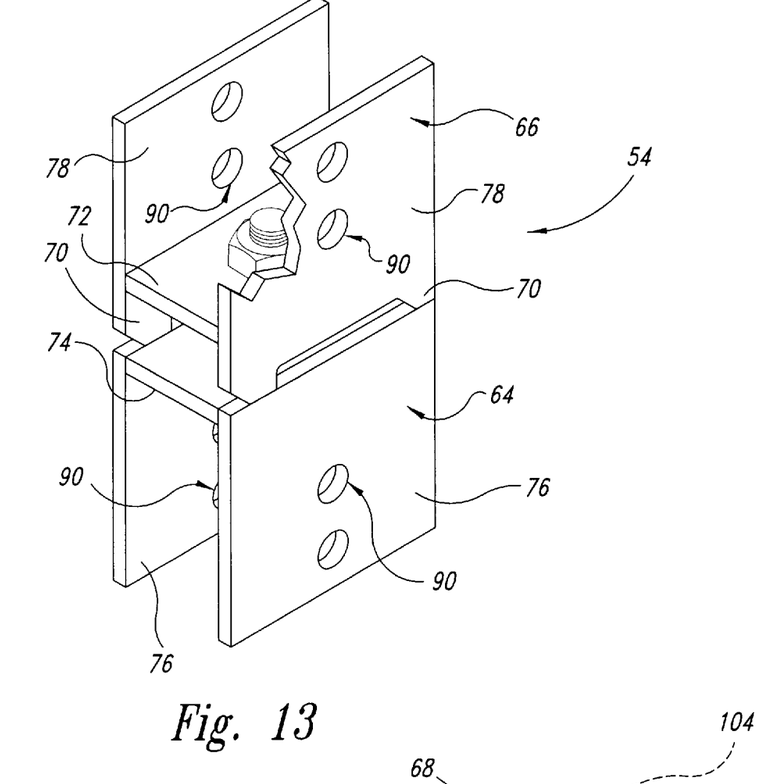
FIG. 13 is an isometric projection of an alternative embodiment of an assembled breakaway bracket assembly formed in accordance with the present invention.
Figure 14:
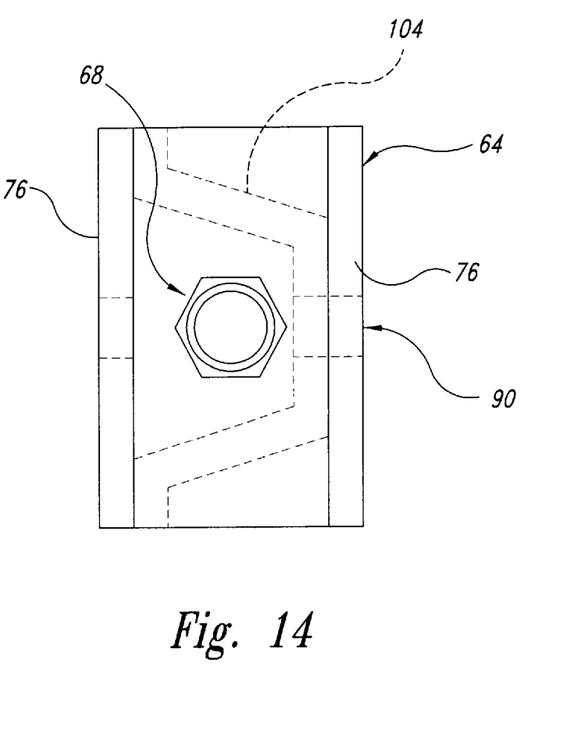
FIG. 14 is a top plan view of the assembled breakaway bracket assembly of FIG. 13 positioned over a base structural member.
Figure 15:
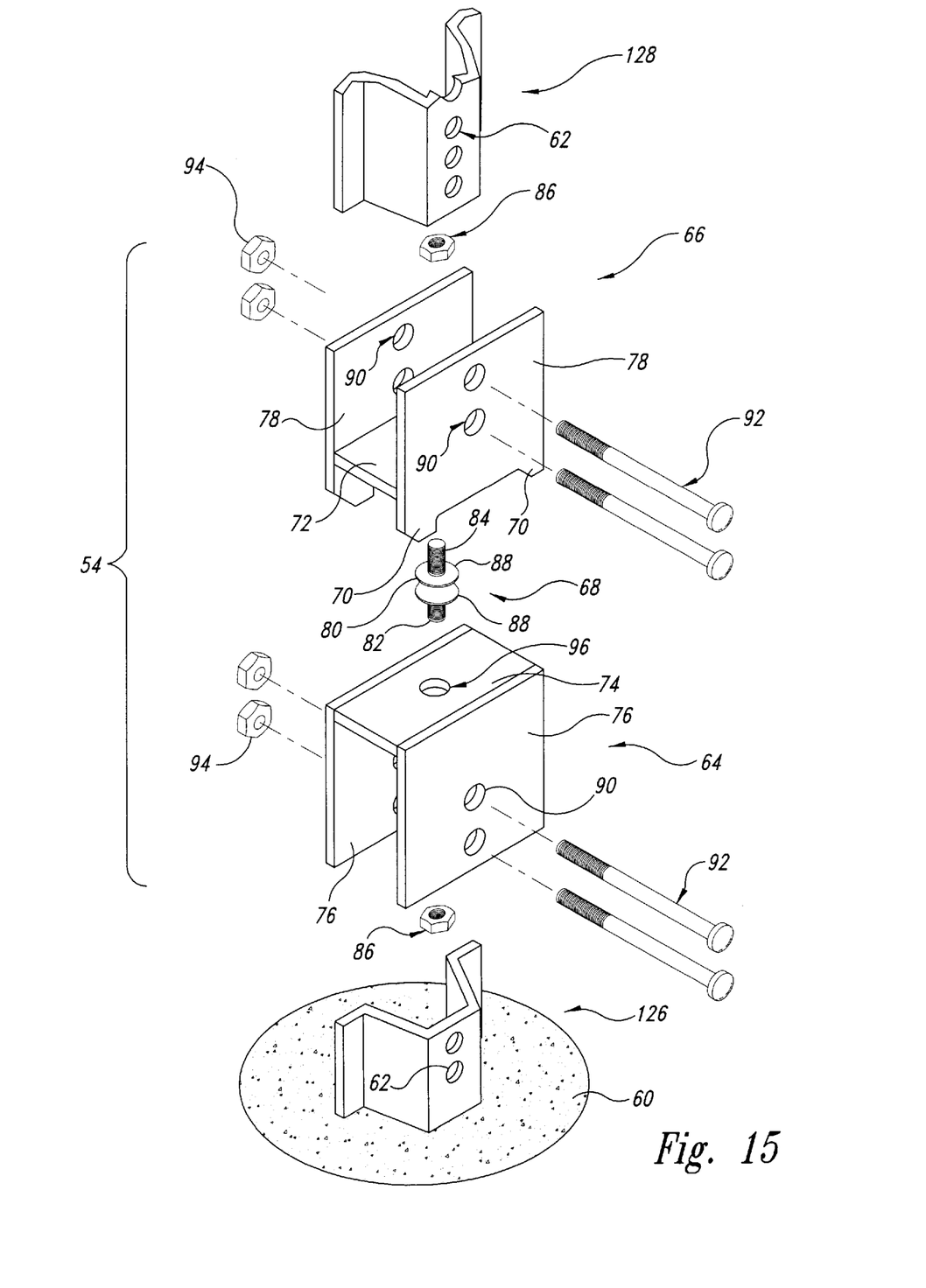
FIG. 15 is an exploded view of the breakaway bracket assembly of FIG. 13 in conjunction with a base and post structural members.

While a preferred embodiment of the invention has been illustrated and described, it is to be understood that various changes may be made therein without departing from the spirit and scope of the invention. For instance, the configuration and size of the breakaway bracket assembly 54 can be modified to accommodate different configurations of posts and bases. For instance, FIGS. 13–14 illustrate a modified version of the breakaway bracket assembly 54 for use in conjunction with an angle iron style base 126 and post 128. The breakaway bracket assembly 54 shown herein differs from the embodiment of FIGS. 6–9 in its size and shape. In all other respects, this embodiment is identical and functions the same as the breakaway bracket assembly 54 described above. Hence, the reference numbers are used with this embodiment.

Consequently, the scope of the invention is to be limited only by the appended claims that follow.

The embodiments of the invention in which an exclusive property or privilege is claimed are defined as follows:

1. A breakaway bracket assembly for holding a post to a base, comprising:

a first bracket member having one or more flanges for attaching said first bracket member to the base;

a second bracket member having one or more flanges for attaching said second bracket member to the post;

a plurality of legs on either of said first bracket member and said second bracket member; and     a breakaway connector positioned between said first bracket member and said second bracket member and attaching said first bracket member to said second bracket member, said breakaway connector having a pre-formed stress point that will fracture when subjected to a predetermined load such that said second bracket member will separate from said first bracket member, the plurality of legs confided to stabilize and support said second bracket member on top of said first bracket member without laterally stressing the breakaway connector.

2. The breakaway bracket assembly of claim 1, wherein said first bracket member is sized and shaped to be slidably engaged with the base.

3. The breakaway bracket assembly of claim 1, wherein said second bracket member is sized and shaped to be slidably received over the post.

4. The breakaway bracket assembly of claim 1, wherein said plurality of legs are positioned a spaced-apart distance around said breakaway connector.

5. A mounting system comprising:

a post for supporting objects;

a base anchored to a structural member;

a first bracket member having one or more flanges for attachment to said base;

a second bracket member having one or more flanges for attachment to said post, said second bracket member having a plurality of legs; and     a breakaway connector positioned between and connecting together said first bracket member and said second bracket member, said breakaway connector having a pre-formed stress point that will break when subjected to a predetermined load such that said second bracket member will separate from said first bracket member, the plurality of legs configured to stabilize and support said second bracket member on top of said first bracket member without laterally stressing the breakaway connector.

6. The system of claim 5, wherein said first bracket member is sized and shaped to be slidably engaged with said base.

7. The system of claim 5, wherein said second bracket member is sized and shaped to be slidably engaged with said post.

8. The system of claim 5, wherein said plurality of legs are spaced apart and positioned equidistantly around said breakaway connector.

\* \* \* \* \*

UNITED STATES PATENT AND TRADEMARK OFFICE
CERTIFICATE OF CORRECTION

PATENT NO.     : 6,210,066 B1
DATED          : April 3, 2001
INVENTOR(S)    : Clifford Dent It is certified that error appears in the above-identified patent and that said Letters Patent is hereby corrected as shown below:

<u>Column 6, claim 1,</u>
Line 21, "legs confided to stabilize" should read -- legs configured to stabilize --.

Signed and Sealed this

Thirtieth Day of October, 2001

Attest:

*Nicholas P. Godici*

NICHOLAS P. GODICI
*Attesting Officer*     *Acting Director of the United States Patent and Trademark Office*